(12) United States Patent
Becker et al.

(10) Patent No.: US 10,041,607 B2
(45) Date of Patent: Aug. 7, 2018

(54) HIGH PRESSURE HYDROGEN VALVE

(71) Applicant: Luxembourg Patent Company S.A., Lintgen (LU)

(72) Inventors: Daniel Becker, Bertrange (LU); Philippe Schmitz, Heisdorf (LU)

(73) Assignee: Luxembourg Patent Company S.A., Luxembourg (LU)

( * ) Notice: Subject to any disclaimer, the term of this patent is extended or adjusted under 35 U.S.C. 154(b) by 50 days.

(21) Appl. No.: 15/100,877

(22) PCT Filed: Dec. 2, 2014

(86) PCT No.: PCT/EP2014/076253
§ 371 (c)(1),
(2) Date: Jun. 1, 2016

(87) PCT Pub. No.: WO2015/082469
PCT Pub. Date: Jun. 11, 2015

(65) Prior Publication Data
US 2016/0305572 A1 Oct. 20, 2016

(30) Foreign Application Priority Data
Dec. 3, 2013 (LU) .......................................... 92321

(51) Int. Cl.
*F16K 31/06* (2006.01)
*F16K 31/40* (2006.01)

(52) U.S. Cl.
CPC ........ *F16K 31/408* (2013.01); *F16K 31/0655* (2013.01); *F16K 31/0693* (2013.01)

(58) Field of Classification Search
CPC ...... F15B 2015/206; F15B 2211/40507; F16K 31/0655; F16K 31/0693; F16K 31/1226;
(Continued)

(56) References Cited

U.S. PATENT DOCUMENTS 4,746,888 A * 5/1988 Ichihashi .............. H01F 7/1607
137/625.65
5,538,026 A * 7/1996 Kazi ..................... F16K 31/408
137/1
(Continued)

FOREIGN PATENT DOCUMENTS

DE 102005049122 A1 * 10/2006 ............ B60T 8/3665
EP 1327809 A1 7/2003
(Continued)

OTHER PUBLICATIONS

International Search Report from corresponding International Application No. PCT/EP2014/076253, dated Feb. 12, 2015.
(Continued)

*Primary Examiner* — Seth W MacKay-Smith
(74) *Attorney, Agent, or Firm* — Sandberg Phoenix & von Gontard P.C.

(57) ABSTRACT

The invention is directed to a gas valve comprising a valve body with a gas inlet, a gas outlet and a gas passage connecting the inlet with the outlet, gas shut-off device in the gas passage, with a seat on the valve body and a movable closure member, an electromagnetic actuator with an electric coil and a movable plunger configured for actuating the closure member of the gas shut-off device, a sleeve extending through the coil and slidably receiving the movable plunger and wherein the sleeve is made of austenitic stainless steel. This avoids embrittlement problems when using the valve with hydrogen under high pressure.

18 Claims, 2 Drawing Sheets

(58) Field of Classification Search
CPC . F16K 31/124; F16K 31/408; H01F 2007/085
USPC .................................................. 251/129.15
See application file for complete search history.

(56) References Cited

U.S. PATENT DOCUMENTS

| | | | |
|---|---|---|---|
| 6,869,060 B2* | 3/2005 | Barber | F15B 13/0405 251/129.15 |
| 2003/0038536 A1* | 2/2003 | Cheong | B60T 8/363 303/119.2 |
| 2012/0001109 A1* | 1/2012 | Nanahara | B60T 8/367 251/129.15 |
| 2015/0028240 A1* | 1/2015 | Grandi | F02M 51/0692 251/129.19 |

FOREIGN PATENT DOCUMENTS

| | | | |
|---|---|---|---|
| EP | 1559935 A1 | 8/2005 |
| EP | 2221516 A1 | 8/2010 |
| EP | 2233806 A1 | 9/2010 |
| EP | 2623624 A1 | 8/2013 |

OTHER PUBLICATIONS

International Preliminary Report on Patentability from corresponding International Application No. PCT/EP2014/076253, dated Jun. 7, 2016.

* cited by examiner

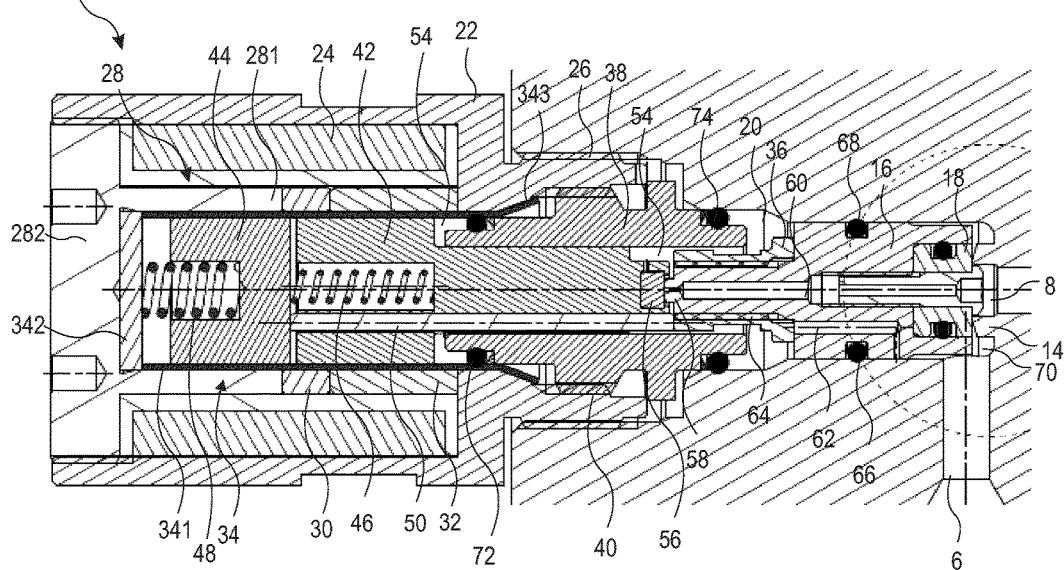
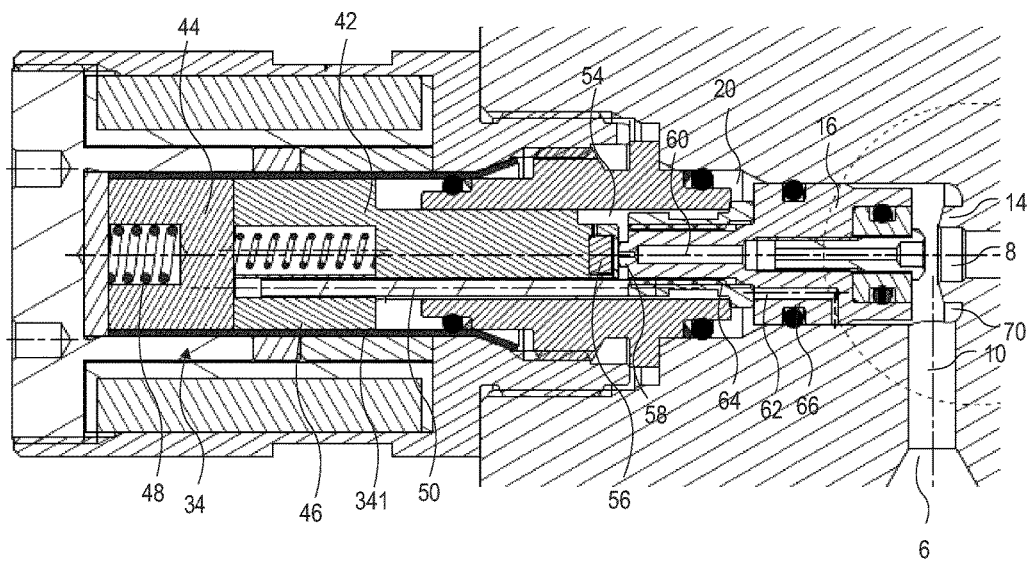

US 10,041,607 B2

HIGH PRESSURE HYDROGEN VALVE

CROSS-REFERENCE TO RELATED APPLICATIONS

The present invention is the US national stage under 35 U.S.C. § 371 of International Application No. PCT/EP2014/076253, which was filed on Dec. 2, 2014, and which claims the priority of application LU 92321 filed on Dec. 3, 2013, the content of which (text, drawings and claims) are incorporated here by reference in its entirety.

FIELD

The invention is directed to a gas valve, more particularly to a gas valve for high pressure gas like hydrogen.

BACKGROUND

Prior art patent document published under EP 1 327 809 A1 discloses a high pressure gas valve with an electromagnetic actuator. The valve comprises a main gas shut-off device and an auxiliary one. The main gas shut-off device comprises a seat formed in the valve body and a movable closure member. The valve comprises an auxiliary chamber on the side of the movable closure member that is opposite to the seat. The movable closure member comprises a central gas passage connecting the auxiliary chamber with the outlet of the valve. The auxiliary chamber is permanently connected with the inlet through a passage of reduced cross area. The electromagnetic actuator comprises a first plunger that is slidably received in the auxiliary chamber, the chamber being surrounded by an electric coil. The first plunger and the movable closure member form the auxiliary gas shut-off device. A second plunger is also slidably received in the chamber. A pin extends through the first plunger so as to abut, at one end, against the second plunger and, at the other end, against the movable closure member. When the electric coil is energized, a magnetic field is created in the first and second plungers and these are attracted to each other. The pin is then pushed by the second plunger so as to keep the movable closure member at a distance from the first plunger. The auxiliary gas shut-off device then opens and the high pressure gas present in the auxiliary chamber flows to the outlet through the central gas passage. The pressure in the auxiliary chamber drops as a result of the reduced cross area of the passage connecting the chamber with the inlet. The drop of pressure in the auxiliary chamber causes the closure member to move in an opening direction. Indeed, the opening force resulting from the high pressure of the inlet acting on an annular surface of the closure member was compensated by a closing effort of a higher magnitude, this effort resulting from the same pressure acting on a larger central surface on the opposite face of the closure member. When the pressure in the auxiliary pressure drops, this compensation is not more active and the closure member moves in an opening direction. When the coil is not more energized, the attracting force between the first and second plungers disappears and the spring between the plungers moves the first plunger towards the movable closure element and closes the auxiliary shut-off device. The pressure in the auxiliary chamber builds then up again and causes the closure element to move towards its seat for closing the valve.

This kind of valve construction is interesting for high pressure gas, i.e., largely above 200 bar. The effort that is necessary to exert on the plunger for closing the valve is reduced in view of the reduced cross section of the auxiliary seat. Additionally, this type of valve is normally closed.

This valve construction causes however embrittlement problems when used with hydrogen. Indeed, hydrogen embrittlement is the process by which various metals, most importantly high-strength steel, become brittle and fracture following exposure to hydrogen. The mechanism starts with lone hydrogen atoms diffusing through the metal. At high temperatures and/or high pressure, the elevated solubility of hydrogen allows hydrogen to diffuse into the metal. When these hydrogen atoms re-combine in minuscule voids of the metal matrix to form hydrogen molecules, they create pressure from inside the cavity they are in. This pressure can increase to levels where the metal has reduced ductility and tensile strength up to the point where it cracks open (hydrogen induced cracking, or HIC). High-strength and low-alloy steels, nickel and titanium alloys are most susceptible to embrittlement.

In the above mentioned patent document EP 1 327 809 A1, the magnetic elements like the annular core extending through the coil and forming the chamber in which the first and second plunger are slidably received must in principle be made of magnetic material, i.e., ideally ferrous material but also high-strength steel. When using this valve with hydrogen, in particular at very high pressure like above 200 bar or even 500 bar, embrittlement can occur in all body parts of the valve that are in contact with hydrogen.

SUMMARY

The technical problem of the invention is to provide a gas valve that avoids the embrittlement problems described above when used with hydrogen under high pressure.

The invention is directed to gas valve, comprising: a valve body with a gas inlet, a gas outlet and a gas passage connecting the inlet with the outlet; a gas shut-off device in the gas passage, with a seat on the valve body and a movable closure member; an electromagnetic actuator with an electric coil and a movable plunger configured for actuating the closure member of the gas shut-off device; a sleeve extending through the coil and slidably receiving the movable plunger; wherein the sleeve is made of austenitic stainless steel, e.g., in various instances of the type AISI 303, 304, 304L, 308, 316, 316Ti, 316L, 321 or 347.

The corresponding designation according to the European standard are: X 8 CrNiS 18-9 (303), X 5 CrNi 18-10 (304), X 2 CrNi 19-11 (304L), X 2 CrNi 18-19 (304L), X 4 CrNi 18-12 (308), X 5 CrNiMo 17-12-2 (316), X 3 CrNiMo 17-13-3 (316), X 6 CrNiMoTi 17-12-2 (316Ti), X 2 CrNiMo 17-12-2 (316L), X 2 CrNiMo 18-14-3 (316L), X 6 CrNiTi 18-10 (321) and X 6 CrNiNb 18-10 (347).

The electric coil can comprise a single coil or several coils that can be electrically interconnected.

According to various embodiments, the sleeve comprises a closed bottom at one end, and an open opposite end.

According to a various embodiments, the sleeve comprises a cylindrical wall welded to the closed bottom. Alternatively, the sleeve can be a unitary piece made by deep stamping.

According to various embodiments, the sleeve comprises a cylindrical wall of an essential constant thickness, e.g., comprised between 0.5 mm and 2 mm, more preferably between 0.5 mm and 1 mm.

According to various embodiments, the sleeve comprises a cylindrical wall with an open end that is generally flared, e.g., with a mean angle comprises between 10° and 45°.

According to various embodiments, it comprises an electromagnetic actuator body receiving the sleeve and with an annular core in contact with the whole of the external surface of the sleeve. The electromagnetic actuator body can comprise a threaded portion for engaging the valve body.

According to various embodiments, it comprises a guide for the plunger, the guide extending inside the sleeve and cooperating in a gas tight fashion with the internal surface of the sleeve at an open end of the sleeve, the guide being, in various instances, screwed into the electromagnetic actuator body. The plunger can comprises a first portion in contact with sleeve and a second portion of a reduced diameter in contact with the guide.

According to various embodiments, the electric coil is received in the electromagnetic actuator body.

According to various embodiments, the sleeve is surrounded by one or more rings of magnetic material extending between the sleeve and the coil.

According to various embodiments, it comprises a core of magnetic material disposed axially in front of the plunger and forming an air gap with the plunger, the air gap and the sleeve being surrounded by a ring of non-magnetic material extending between the sleeve and the coil, so as to force the magnetic field into the sleeve through the core and the plunger.

According to various embodiments, the ring of non-ferromagnetic material is arranged between two rings of ferromagnetic material. The ring of non-magnetic material could be replaced by an air gap. One of the rings of ferromagnetic material can be sandwiched between a shoulder portion of the electromagnetic actuator body and the non-ferromagnetic ring. The other ferromagnetic ring can be unitary with a plug of the electromagnetic actuator body, at the end of the body that is opposite to the valve body.

According to various embodiments, the plunger is a first plunger, the core being a second plunger slidably received in the sleeve.

According to various embodiments, a first spring is arranged between the first and second plungers so as to exert a biasing force that tends to move away the plungers, and/or a second spring is arranged between the second plunger and a bottom of the sleeve so as to exert a biasing force that tends to move the second plunger away from the bottom.

According to various embodiments, the internal surface of the sleeve delimits a chamber in permanent connection with the inlet.

According to various embodiments, the movable closure member of the shut-off valve is able to slide in a bore in a gas tight fashion so as to delimit an auxiliary chamber on the side of the member that is opposite to the shut-off valve seat, the member comprising a first channel permanently interconnecting the valve inlet with the chamber and a second channel interconnecting the chamber with the valve outlet in a closable manner by the movable plunger.

According to various embodiments, the plunger comprises a pin slidably extending through the first plunger and configured to abut at one end against the second plunger and at the other end against the movable closure member, the first plunger moving towards the second plunger when the coil is energized so as to open the second channel.

According to various embodiments, the movable closure member comprises a valve seat around its second channel and the plunger comprises a contact surface cooperating with the seat. The contact surface can be made by a disk of plastic material or any material that is softer than the material of the seat.

According to various embodiments, the flow section of the first channel is less than the flow section of the second channel, for example in various instances less than 50%, e.g., in other instances less than 30%, e.g., in yet other instances less than 20% of the flow section of the second channel.

According to various embodiments, the flow section of the first channel is made by a threaded engagement, e.g., between the internal threaded surface of a threaded sleeve and the exterior threaded surfaces of the movable closure member.

According to various embodiments, the valve body is made of austenitic stainless steel.

The ferromagnetic material used in the valve can feature a mass magnetic susceptibility x that is comprises between 1 000 and 10 000 10-8 m3/kg and/or a saturation magnetisation is of about 1 Henry at room temperature (e.g. 20° C.). Non-exhaustively, it can be iron, ferrite or permalloy. Non ferromagnetic material can be aluminium or stainless steel, also non-exhaustively.

The invention is particularly interesting in that it provides an electromagnetically actuated valve that can be used with gases like hydrogen that are susceptible to cause embrittlement of the metallic material of the valve that is in contact with the gas. The solution proposed is particularly interesting for it is quite simple and efficient.

DRAWINGS

FIG. 2 is an enlarged view of the valve mechanism in the closed position as in FIG. 1, in accordance with various embodiments of the invention.

FIG. 3 is an enlarged view of the valve mechanism in the open position, in accordance with various embodiments of the invention.

DETAILED DESCRIPTION

Figure 1:
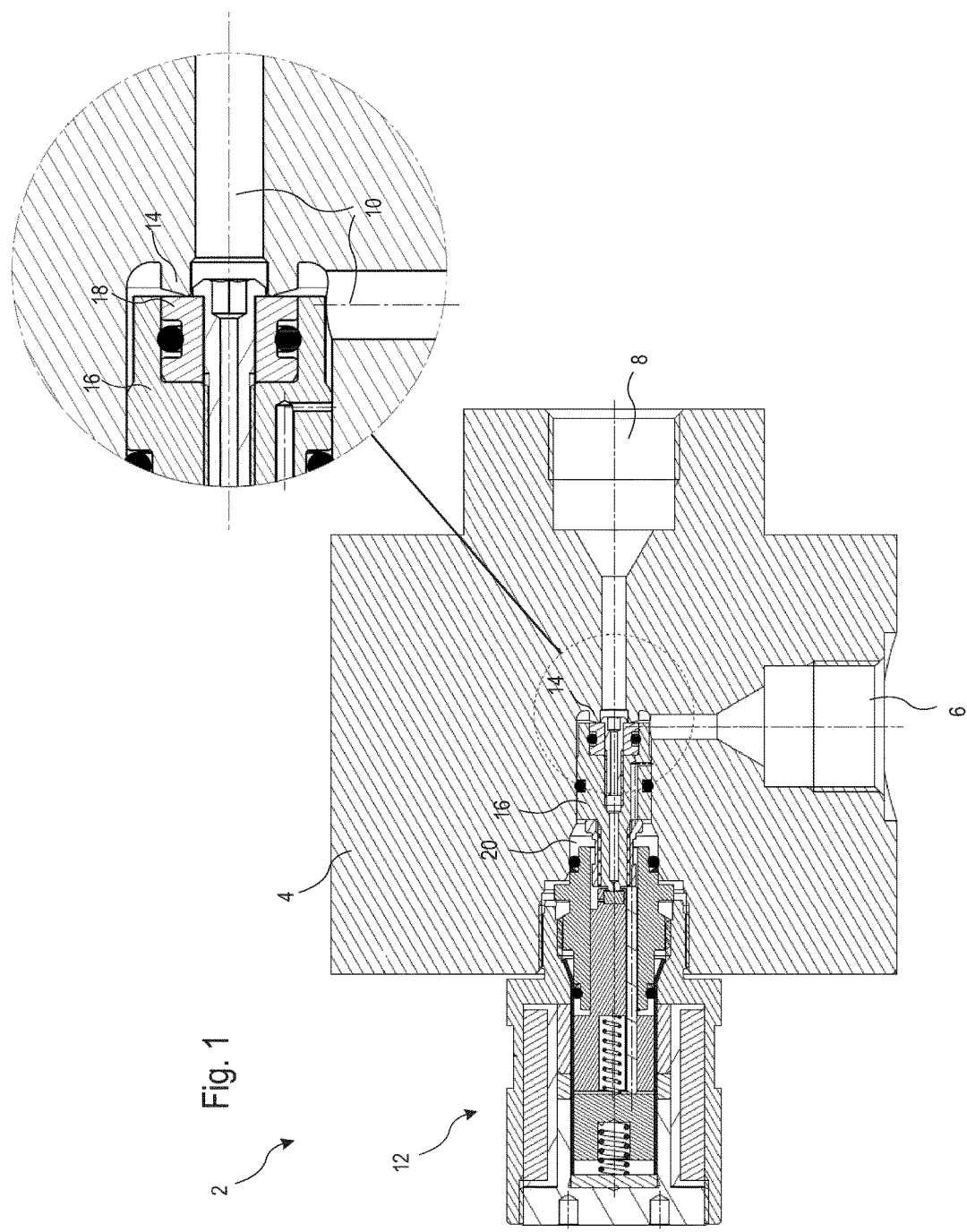
FIG. 1 is a sectional view of a valve, in accordance with various embodiments of the invention.

FIG. 1 is a section view of a valve in accordance with the invention. The valve 2 comprises a valve body 4 with a gas inlet 6, a gas outlet and a gas passage connecting the inlet 6 with the outlet 8. The valve 2 comprises also an electromagnetic shut-off cartridge 12 fixed to the valve body. To that end the valve body 4 comprises a generally circular cavity or bore 20 into which the cartridge 12 is fixed, e.g., by screwing.

The cavity 20 extends to the gas passage 10 which comprises a main valve seat 14 in the valve body 4. The electromagnetic shut-off cartridge 12 comprises a main movable closure member 16 with a contact surface 18 that cooperates with the main valve seat 14 in a gas tight fashion for opening and closing the gas passage 10.

The electromagnetic shut-off cartridge 12 will be described more in details in connection with FIGS. 2 and 3 which are enlarged view of the cartridge in the closed and open positions, respectively.

The electromagnetic shut-off cartridge 12 comprises a cartridge body 22 that is fixed to the valve body 4 in various instances by a threaded engagement 26 in the cavity 20. The cartridge body 22 forms a longitudinal cavity extending through the whole body. This cavity houses on its external side (the left side on the figures) a sleeve 34 surrounded by rings 281, 30 and 32 arranged side by side, these rings being surrounded by a magnetic coil 24. The sleeve 34 houses two plungers 42 and 41 that will be described further in the present description.

The sleeve is made of austenitic stainless steel, e.g. of the 303, 304, 304L, 308, 3016, 316Ti, 316L, 321 or 347 type (according to the American Iron and Steel Industry standard). Stainless steels may be classified by their crystalline structure into three main types: Austenitic, Ferritic and Martensitic. Austenitic steels have austenite (also known as gamma phase iron γ-Fe) as their primary phase (face centred cubic crystal). These are alloys containing chromium and nickel (sometimes manganese and nitrogen), structured around the Type 302 composition of iron, 18% chromium, and 8% nickel. Austenitic steels are in principle not hardenable by heat treatment. The use of austenitic stainless steel is particularly interesting in that it is not subject to embrittlement when used with hydrogen under high or very high pressure.

The sleeve 34 comprises a cylindrical wall 341 and a closed bottom 342 that is in various instances welded to the cylindrical wall 341. The sleeve 34 comprises also an open end 343 opposite to the bottom 341, the open end 343 being, in various instances, flared. The cylindrical wall 341 of the sleeve 34 presents a reduced wall thickness that is in various instances comprised between 0.2 and 1.5 mm. The bottom 342 can be thicker, e.g. between 1 and 3 mm. The complete sleeve 34, including its bottom, can also be made by stamping.

The rings 281, 30 and 32 form the annular or cylindrical core of the magnetic actuator of the valve whereas the body 22 forms a yoke bridging the core. The ring 30 positioned essentially centrally along the longitudinal axis of the sleeve 34 and interposed between the ring 28 and the ring 32 is made of non-ferromagnetic material whereas the two other rings 281 and 32 are made of ferromagnetic material. The magnetic field produced by the coil 24 when it is energized forms a loop around the cross-section of the coil. The ferromagnetic core and yoke increase the strength of the field of the coil alone, due to the high magnetic permeability p and susceptibility x of the ferromagnetic material. The magnetic field is however forced inside the sleeve at the level of the non-ferromagnetic ring 30, so as to magnetize the plungers 41 and 42. The bottom 342 of the sleeve 34 being made of austenitic stainless steel, which has a low magnetic permeability, prevents the magnetic field from entering in a substantial manner the cavity of the sleeve through the bottom.

In the illustrated design, the ferromagnetic ring 281 is unitary with a plug portion 282 closing the cavity of the cartridge body 22 at its external end (left end on the figures). The plug portion 282 comprises an external thread engaging with a corresponding thread on the body 22 and two blind holes for engaging with a tightening tool. The ring 281 and the plug portion 282 form therefore a further element 28 of the cartridge body. Other designs are however possible. In various embodiments, the plug can be separate from the ring.

The cavity 54 inside the sleeve 34 is closed at the side of the sleeve that is directed to the valve body by an element 38 that is fixedly attached to the cartridge body 22 after that the sleeve 34 is housed in the cavity. This element 38 is, in various embodiments, attached by means of a threaded engagement 40. It comprises a generally cylindrical inner guiding surface into which the first plunger 42 extends. This first plunger 42 comprises at its end directed towards the valve body a contact surface 56 cooperating with an auxiliary seat 58 formed on the movable closure member 16. This latter comprises a longitudinal channel 60 correcting the chamber 54 through the seat 58 with the gas passage 10 at the outlet side 8. The seat 58 and the corresponding contact surface 56 on the first plunger 42 constitute an auxiliary shut-off device for actuating the movable closure member 16. In various embodiments, this latter can be slidably housed in a bore 20 in the valve body 4. The gasket 66 divides the cavity in the valve body between a high pressure chamber 70 (on the right side in the figures) that is in permanent connection with the gas inlet 6, and an auxiliary chamber 54 (on the left side in the figures). The movable closure member 16 comprises a channel 62 that permanently connects the high pressure chamber 70 with the auxiliary chamber 54. Throttle means are provided for throttling the flow of gas from the high pressure chamber to the auxiliary chamber. These means can comprise a threaded sleeve 36 that is engaged around a longitudinal protrusion of the movable closure member 16 so as to limit the cross-sectional area of the gas passage from the high pressure chamber. The threaded engagement 64, i.e., more particularly its lengths, constitute a reduced cross section that causes a pressure drop for the gas flow from the high pressure chamber to the auxiliary chamber 54. The equivalent flow section between the high pressure chamber 70 and the auxiliary chamber 54 is smaller than the flow section in the auxiliary seat 58 so that when the auxiliary shut-off device made of the seat 58 and the contact surface 56 is open, the pressure in the auxiliary chamber 54 drops so as to allow movement of the closure member 16 and opening of the valve.

The function of the valve is the following:

In the closed state of the valve as illustrated in FIG. 2, the electric coil 24 is not energized and the springs 46 and 48 keep the first plunger 42 pressed against the movable closure 16 and keep therefore the auxiliary shut-off device made of the contact surface 56 and the seat 58 in a closed state. The high pressure from the high pressure chamber 70 is also present in the auxiliary chamber 54. This pressure urges the closure member 16 against its seat 14 and keeps therefore the passage 10 in a closed stage.

For opening the valve, the coil 24 is energized so as to create a magnetic field in the core 281 and 32 and also in the plungers 44 and 42. At least one of the plungers being made of ferromagnetic material, the magnetic field that is generated therein has for effect to generate an attractive force that presses the two plungers 42 and 44 to each other against the resilient force of the spring 46. This action causes a movement of the first plunger 42 away from the closure member 16 since the pin 50 keeps constant the distance between the second plunger 44 and the closure member 16. By means of this movement of the first plunger 42, the auxiliary shut-off device 56, 58 opens and the gas under high pressure in the auxiliary chamber 54 flows through the seat 58 and the channel 60 to the outlet 8. This gas flow causes a pressure drop in the auxiliary chamber 54 due to the restricted passage 64. The closing force resulting from the pressure in the auxiliary chamber drops to a level where is does not counteract anymore the opening force resulting from the pressure in the high pressure chamber 70 applied against the annular section of the closure member 16 outside of the seat 14. The closure member 16 is therefore moved to an open position thereby fully opening the valve as illustrated in FIG. 3.

The use of an auxiliary chamber with an auxiliary shut-off device permits to limit the forces that are to be exerted for opening or closing the valve. This is therefore particularly interesting for gas under high and very high pressure, i.e., above 200 bar, 300 bar, 400 bar or even 500 bar. The construction is such that the chamber is filled with the gas so that when using this valve with a gas like hydrogen that is susceptible to cause embrittlement, the solution provided here is particularly interesting and advantageous.

The invention claimed is:

1. A gas valve, said valve comprising:
    a valve body with a gas inlet, a gas outlet and a gas passage connecting the gas inlet with the gas outlet;
    a gas shut-off device in the gas passage, with a seat on the valve body and a movable closure member;
    an electromagnetic actuator with an electric coil and a first plunger structured and operable to actuate the movable closure member of the gas shut-off device;
    a sleeve extending through the electric coil and slidably receiving the first plunger, wherein the sleeve is made of austenitic stainless steel; and
    a second plunger slidably received in the sleeve and forming a core of magnetic material disposed axially in front of the first plunger and forming an air gap with the first plunger wherein the first plunger comprises a pin slidably extending through the first plunger and configured to abut at one end against the second plunger and at the other end against the movable closure member, the first plunger moving towards the second plunger when the electric coil is energized so as to open a second channel in the movable closure member, interconnecting the gas inlet with the gas outlet.

2. The gas valve according to claim 1, wherein the sleeve comprises a closed bottom at one end, and an open opposite end.

3. The gas valve according to claim 2, wherein the sleeve comprises a cylindrical wall welded to the closed bottom.

4. The gas valve according to claim 1, wherein the sleeve comprises a cylindrical wall of an essentially constant thickness between 0.5 mm and 2 mm.

5. The gas valve according to claim 1, wherein the sleeve comprises a cylindrical wall with an open end that is generally flared with a mean angle between 10° and 45°.

6. The gas valve according to claim 1 further comprising an electromagnetic actuator body receiving the sleeve and with an annular core in contact with an external surface of the sleeve.

7. The gas valve according to claim 6 further comprising a guiding element for the first plunger, the guiding element extending inside the sleeve and cooperating in a gas tight fashion with an internal surface of the sleeve at an open end of the sleeve, the guiding element being screwed into the electromagnetic actuator body.

8. The gas valve according to claim 6, wherein the electric coil is received in the electromagnetic actuator body.

9. The gas valve according to claim 1, wherein the sleeve is surrounded by one or more rings of magnetic material extending between the sleeve and the electric coil.

10. The gas valve according to claim 1, wherein the air gap and the sleeve are surrounded by a ring of non-magnetic material extending between the sleeve and the electric coil, so as to force the magnetic field into the sleeve through the core and the first plunger.

11. The gas valve according to claim 10, wherein the ring of non-magnetic material is arranged between two rings of magnetic material.

12. The gas valve according to claim 1 further comprising at least one of:
    a first spring arranged between the first and second plungers so as to exert a biasing force that tends to move away the plungers; and
    a second spring arranged between the second plunger and a bottom of the sleeve so as to exert a biasing force that tends to move away the second plunger from the bottom.

13. The gas valve according to claim 1, wherein the sleeve delimits a chamber in permanent connection with the gas inlet.

14. The gas valve according to claim 1, wherein the movable closure member of the gas shut-off device is able to slide in a bore in a gas tight fashion so as to delimit an auxiliary chamber on the side of the movable closure member that is opposite to the shut-off device seat, the movable closure member comprising a first channel permanently interconnecting the gas inlet with the auxiliary chamber and a second channel interconnecting the auxiliary chamber with the gas outlet in a closable manner by the first plunger.

15. The gas valve according to claim 14, wherein the movable closure member comprises a valve seat around its second channel and the first plunger comprises a contact surface cooperating with the valve seat.

16. The gas valve according to claim 14, wherein a flow section of the first channel is at greatest 50% less than a flow section of the second channel.

17. The gas valve according to claim 16, wherein the flow section of the first channel is made by a threaded engagement between an internal threaded surface of a threaded sleeve and an exterior threaded surface of the movable closure member.

18. The gas valve according to claim 1, wherein the valve body is made of austenitic stainless steel.

* * * * *